(12) United States Patent
Rodriguez-Jovet

(10) Patent No.: US 8,153,004 B2
(45) Date of Patent: Apr. 10, 2012

(54) GREASE TRAP WITH DETACHABLE RESIDUE INTERCEPTOR

(76) Inventor: Felix Juan Rodriguez-Jovet, Ponce, PR (US)

( * ) Notice: Subject to any disclaimer, the term of this patent is extended or adjusted under 35 U.S.C. 154(b) by 228 days.

(21) Appl. No.: 12/618,436

(22) Filed: Nov. 13, 2009

(65) Prior Publication Data
US 2010/0122954 A1 May 20, 2010

Related U.S. Application Data

(60) Provisional application No. 61/114,572, filed on Nov. 14, 2008.

(51) Int. Cl.
*B01D 36/04* (2006.01)
*B01D 17/025* (2006.01)

(52) U.S. Cl. ........ 210/305; 210/307; 210/461; 210/521; 210/532.1; 210/538

(58) Field of Classification Search .......... 210/299, 210/305, 307, 308, 309, 459, 461, 470, 471, 210/482, 521, 532.1, 534, 535, 538
See application file for complete search history.

(56) References Cited

U.S. PATENT DOCUMENTS

| | | | |
|---|---|---|---|
| 1,474,938 A * | 11/1923 | Marsh | 210/305 |
| 2,281,590 A * | 5/1942 | Newton | 210/534 |
| 4,268,396 A * | 5/1981 | Lowe | 210/532.1 |
| 6,749,746 B2 * | 6/2004 | Mokrzycki | 210/538 |
| 6,800,195 B1 * | 10/2004 | Batten et al. | 210/307 |
| 7,083,721 B2 * | 8/2006 | McClure et al. | 210/305 |
| 7,438,803 B1 * | 10/2008 | Allen | 210/521 |
| 7,682,509 B2 * | 3/2010 | Murray et al. | 210/521 |
| 7,815,800 B2 * | 10/2010 | Komatsu | 210/307 |
| 2006/0163130 A1 * | 7/2006 | Happel et al. | 210/299 |
| 2006/0237362 A1 * | 10/2006 | Weymouth | 210/299 |

* cited by examiner

*Primary Examiner* — Christopher Upton

(57) ABSTRACT

An apparatus and method to separate grease and solids from wastewater before reaching the sewers using a grease trap, wherein said grease trap comprises a detachable residue trap reducing turbulence and including a mesh which efficiently trap solid particles from the water waste in other to make easier the compliance with regulating agencies.

9 Claims, 4 Drawing Sheets

GREASE TRAP WITH DETACHABLE RESIDUE INTERCEPTOR

RELATED APPLICATIONS

This application is related to provisional U.S. patent application Ser. No. 61,114,572 filed on Nov. 14, 2008.

BACKGROUND OF THE INVENTION

1. Field of the Invention

The invention is related to grease traps, more particularly to an apparatus and method to separate grease and solids from wastewater before reaching the sewers.

2. Discussion of the Background

Grease traps, also known in the art as grease interceptors, and grease recovery devices are mechanisms intended to capture greases and solids before they enter the sanitary system. Grease traps are usually constructed of concrete, fiberglass or steel having high grease and solid storage capacities for high flow applications. Generally, said grease traps are used in restaurant and foodservice kitchens wherein a lot of waste grease including fats, oils, grease and other residues are present. The waste material is normally known as "fats, oils, and grease" (FOG). Grease traps tend to remove all the FOG from the wastewater before it reaches the sewers in order to comply with government regulations.

As mentioned the main purpose of the grease traps is to retain oil, grease and other solids well trapped, allowing cleaner wastewater to flow onto the public sewer. However, sometimes residues or waste materials are not completely contained inside of said traps and end up reaching public sewer facilities without complying with parameters regulated by local authorities. For example, U.S. Pat. No. 5,993,646 to Powers discloses a grease trap having an inlet member, a discharge member, plurality inner walls defining chambers within, and a relief member for flushing accumulated waste matter. In general the fluid flows through to a chamber including an inlet chamber, a preliminary chamber, an outlet chamber, a discharge chamber, and a reservoir chamber. A gauge member adjacent to the reservoir chamber is adapted to view waste accumulation which, when necessary, is flushed through the relief member via the reservoir chamber. However even when the grease trap has a system to flush out the waste material the residue that move on the top of the chamber reaches the sewers due to the impact effect of liquids received from the sinks, or even worse, from dishwasher machines, creating turbulence in the first chamber, pushing solids away towards the outlet.

Therefore there is a need for a grease trap capable to contain effectively the residues flowing through the waste water.

SUMMARY OF THE INVENTION

The present invention overcomes the disadvantages of the Prior Art providing a grease trap with a detachable residue interceptors comprising at least a removable mesh fixed to a residue trap opening using several attachments, wherein said residue interceptors efficiently reduce turbulence and trap solid particles from the wastewater, making it easier to comply with local agency regulations. Another object of the invention is to provide a detachable residue interceptor which can be easily removed, cleaned, washed and reused, or alternatively dropped in the garbage and replaced with a new mesh.

Another object of the invention is to reduce bad odors at the grease trap.

Another object of the invention is to simplify and reduce the cleaning time in such way that the personnel in charge of cleaning has complete access to make a better interior cleaning and make sure that, even when pumped out, less residues are left behind.

Another object of the invention is to complete and control immediate turbulence in the first chamber allowing the greases to get organized in the very first chamber while clean water flows ahead.

Another object of the invention is to provide a flow second path to avoid clogging of the trap when all meshes get full.

Another object of the invention is to provide an inner wall to avoid clogging due to the meshes interfering with the waste water flow.

Yet another object of the invention is to provide an easy mesh assembling at the residue trap.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate the preferred embodiment of the invention.

DESCRIPTION OF THE PREFERRED EMBODIMENT

The present first embodiment of the grease trap comprises several parts, made from different materials, wherein said parts are assembled to provide a receptacle to regulate flow and clean wastewater before the waste water is deposited into city sewers. For example, materials including but not limited to polypropylene (white, clear) panels, aluminum angles or frames, rubber joints with adhesive, stainless steel locknuts, screws and nuts, stainless steel hinges with bearings, butterfly nuts and dowel screws, galvanized knobs, PVC-SCH40 pipes, fittings and tubular meshes of different materials, such as cotton or poly-cotton fiber, are assembled together to construct the present grease trap 1.

Figure 1:
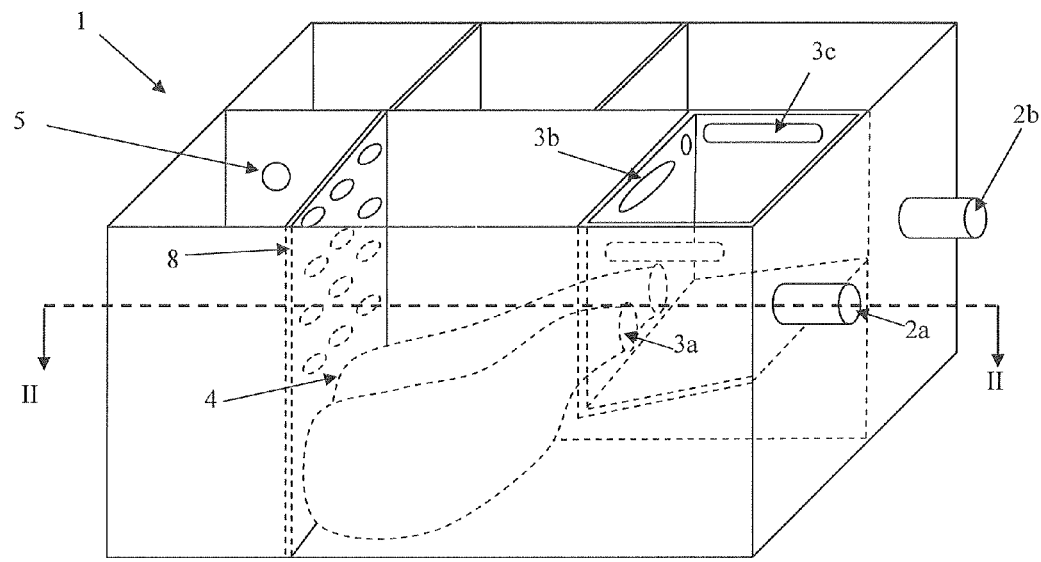
FIG. 1 is an isometric view of the first embodiment of the grease trap.

FIG. 1 shows the assembly of a grease trap 1 using said materials, wherein said grease trap 1 comprises several chambers I-VI, an inlet 2a providing a path for the waste water pipes from the restaurant or food service kitchen to be treated at the grease trap 1, an outlet 2b providing a path for the treated waste water to reach the sewer pipes, several baffles forming the chambers I-VI and a residual trap 3.

The aluminum frame covering some polypropylene panels are used to create outer walls for the grease trap 1. Inside said outer walls several baffles are assembled to create the chambers I-VI. As shown in FIG. 1, the baffles arrangement creates a first chamber I which is the first chamber to get in contact with the waste water. As illustrated the first chambers' dimensions are bigger than the other chambers II-VI.

The aluminum frame covering some polypropylene panels are used to create outer walls for the grease trap 1. Inside said outer walls several baffles are assembled to create the chambers I-VI. As shown in FIG. 1, the baffles arrangement creates a first chamber I which is the first chamber to get in contact with the waste water. As illustrated, the first chamber's dimensions are bigger than the other chambers II-VI.

Figure 2:
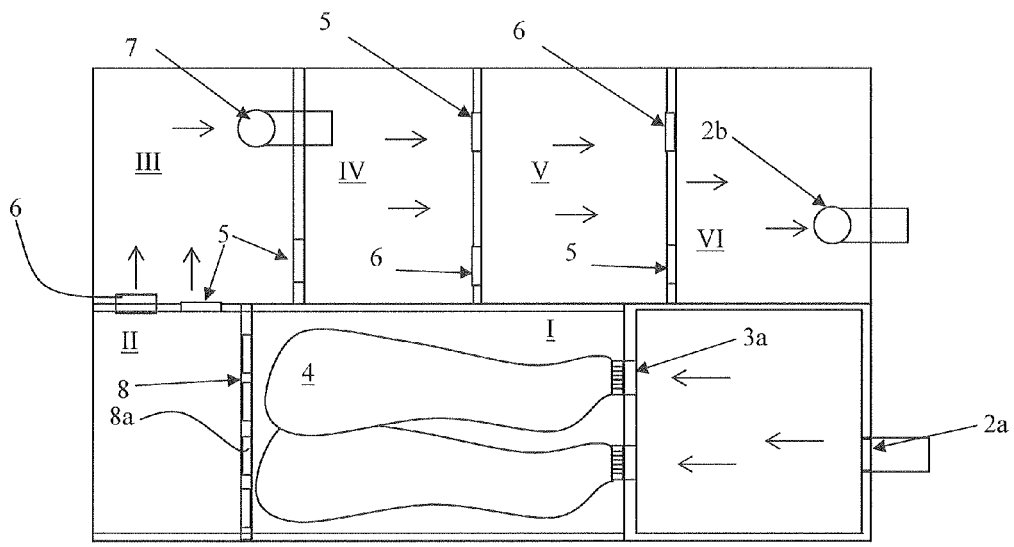
FIG. 2 is a top view of the first embodiment of the grease trap.

During the water waste treating process the wastewater accesses the grease trap 1 through an opening 2a formed at the first chamber I of the grease trap 1. Most of the residues at the waste water are removed at the first chamber I by means of a turbulence buffer or detachable residue trap 3. The detachable residue trap 3 is fixed inside said first chamber I, wherein the opening 2a is aligned and physically connected to the intake of the removable residue trap 3 as shown in FIG. 2. In the instance case, the inner wall of chamber I is shaped to hold the residue trap 3 in position in such way that the flow of wastewater interacts with the residue trap 3 instead of directly contacting the first chamber I. The residue trap 3 serves as a buffer for the waste water turbulence before the waste water moves through the chambers I-VI in a particular order creating a path wherein each chamber help with the treating process of said waste water.

Figure 3:
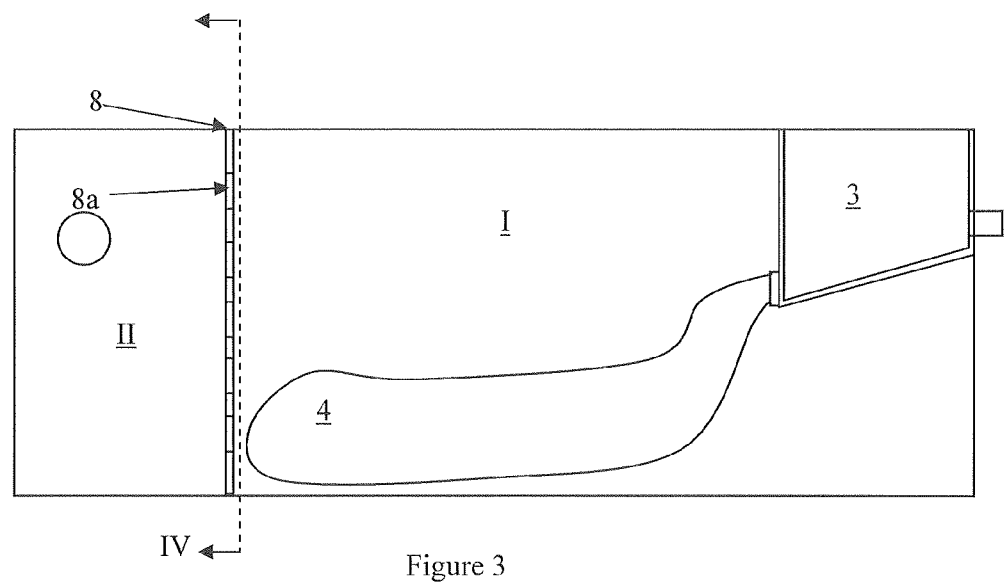
FIG. 3 is a side view of the first embodiment of the grease trap.
Figure 4:
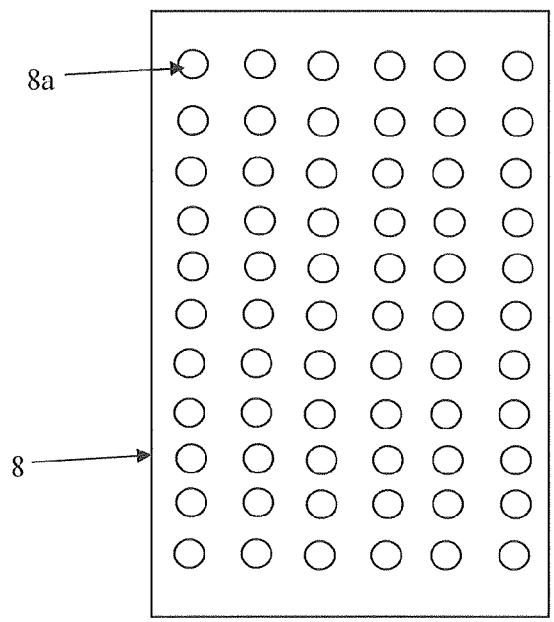
FIG. 4 is an exploded and front view of the inner wall of the first embodiment of the grease trap from FIG. 3.

As mentioned before and as shown in FIG. 3, the first chamber I is configured to control the displacement of the detachable residue trap 3. The dimensions of that first chamber are restricted by an inner wall baffle 8 which serves as a wall between chamber I and chamber II. The wall 8 is positioned at a point wherein enough space is provided for the extension of a mesh 4 connected to the residue trap 3. The inner wall 8, as shown in FIG. 4, comprises several openings 8a. The openings 8a avoid the clogging due to the mesh 4 while provides different path for the waste water flow to reach the subsequent chamber. The wall 8 is removable for cleaning purposes wherein said chamber I is configured to fix and support said wall 8 in position.

Figure 5:
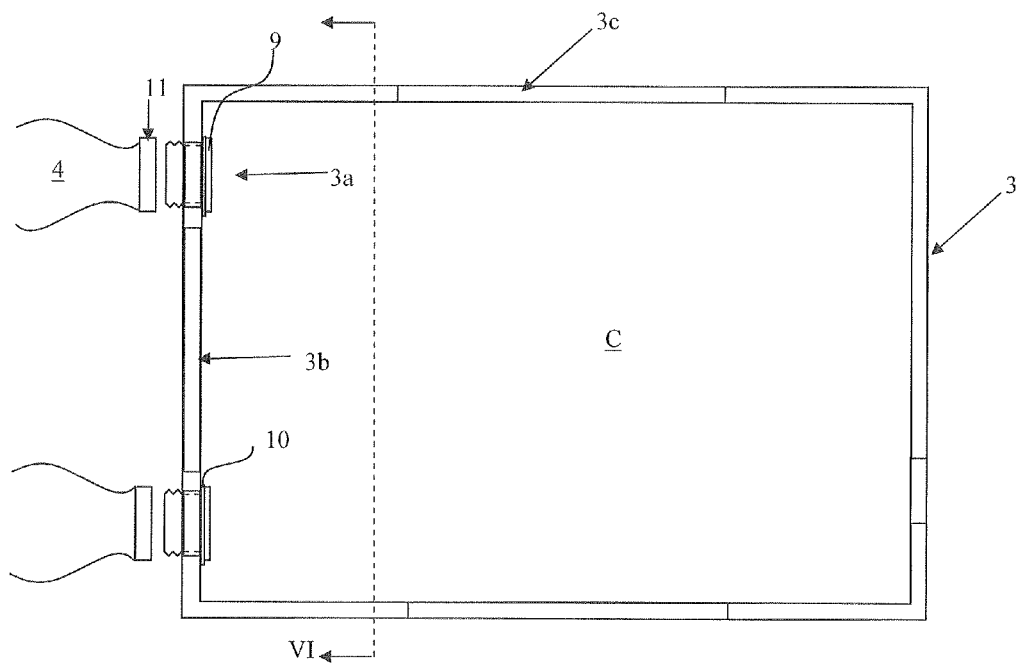
FIG. 5 is a top view of the residue trap.
Figure 6:
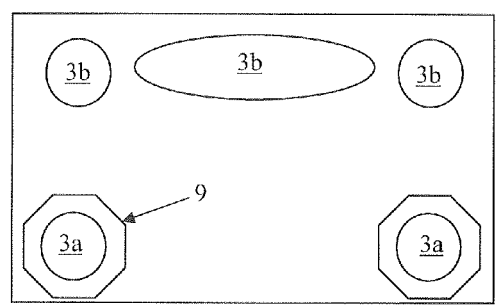
FIG. 6 is an exploded view of the residue trap segment from FIG. 5.

The residue trap 3, as shown in FIG. 5, comprises a receptacle device which includes a boxlike compartment or drawer structure C fixed inside the grease trap 1, but more specifically inside the first chamber I wherein said drawer structure comprises at least an inlet for a residue trap, at least one opening or outtake 3a connected through an adapter 9, 11 to a bag or mesh 4, at least an overflow escape 3b and handles 3c. The residue trap 3 is provided with a deeper bottom on the side of the openings 3a were the meshes 4 are to be connected in order to control turbulence while assisting the flow of wastewater. The adapter can be formed integrally with the residue trap 3 or separate. The present invention provides an adapter 9, 11 comprising a mesh's holder 9 having a hollow body with a flange at a distal end and a spiral ridge or thread at the other end. The flange is configured to be fixed inside the residue trap 3 while the pipe extends through the residue opening 3a. The flange is shaped to have a surface that in combination with the residue trap's 3 surface avoiding the rotation of the hollow body after assembled. For example, a cylindrical hollow body with a hexagonal flange is provided in FIG. 6. The thread end is adapted to receive a mesh's fixing portion such as a nut 11.

Figure 7:
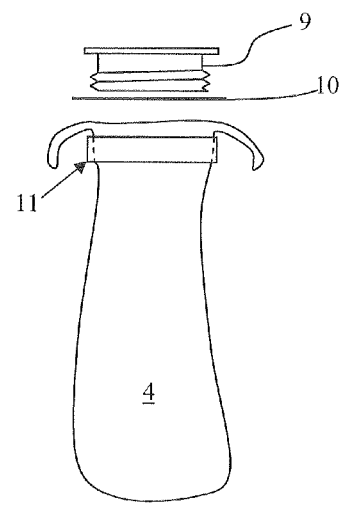
FIG. 7 shows the mesh parts for assembly at the residue trap.

The mesh's fixing portion 11 firmly holds the mesh 4 to the residue trap 3 using hollow body threads and said a mesh's fixing portion 11. FIG. 7 shows the mesh 4 assembly, the residue trap is not presented in order to clearly disclose said assembly. The hollow body 9 is first inserted through openings 3a wherein the flange is positioned inside the residue trap 3. A gasket or seal 10 is provided between the hollow body 9 flange and the residue trap 3. The hollow body 9 is positioned inside the opening 3a in such way that at least the hollow body's thread extend away from the opening 3a. The mesh fixing portion 11 is connected and/or fixed to the hollow body 9. However before the connection, said mesh 4 is inserted through the center of the mesh's fixing portion 11 until a portion of the mesh 4 is folded back leaving a short piece over the mesh's fixing portion outer surface. Then the mesh's fixing portion 11 is fixed to hollow body 9 using the thread which simultaneously fixes the mesh 4. Usually the connection is the same for all meshes 4.

Figure 8:
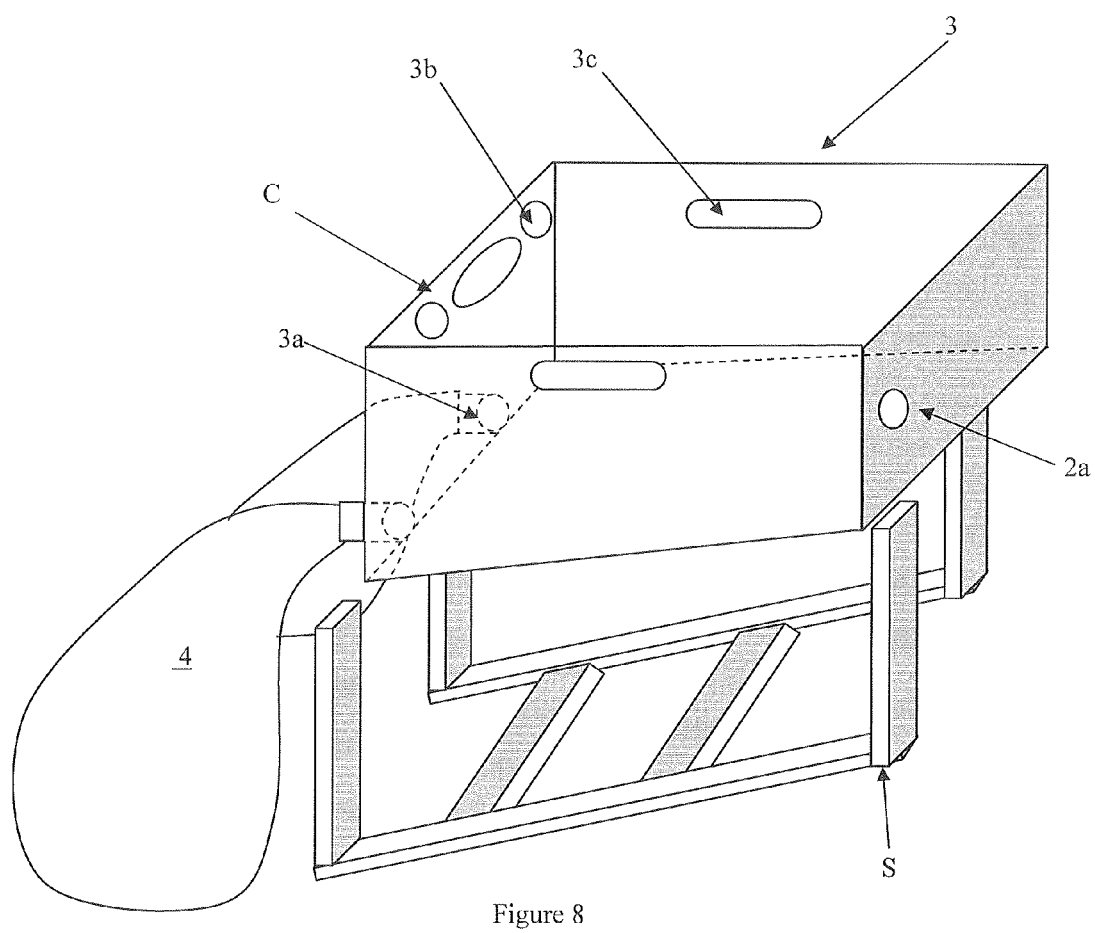
FIG. 8 is an isometric view of the residue trap.

FIG. 8 provides an isometric view of the residue trap 3. A support structure S which can be provided at the grease trap 1 inside the first chamber I controls the displacement of said residue trap 3 making the detachment of the residual trap 1 easier from the first chamber I, if needed, for cleaning.

During the waste water treating process the waste water carries grease, oil, vegetables and a variety of other solid particles from the dish washing process and floor drains connected to the first chamber I of the grease trap 1. The flow enters with turbulence due to the impact of liquids received from the inlet 2a. The residue trap 3 substantially controls the turbulence avoiding the waste water to push solids away towards the outlet 2b. When the waste water reaches the drawer 3 it is directed to the residue trap outtake wherein the meshes 4 are connected. Letting the water pass through, the mesh 4 serves as a filter wherein solid particles are trapped inside the mesh 4, making it easier to comply with parameters regulated by local authorities. Also, since fewer solids remain at the bottom of the wastewater, the bad odors due to the decomposition are avoided or reduced.

As mentioned before, the residue trap 3 is provided with overflow escapes 3b. The main purpose of the overflow escapes is to continue with the wastewater treatment even if clogging occurs at the residue outtake. Further, a mechanical or electronic alert can be introduced in such way that the user will know if clogging due to overloaded meshes are taking place.

When the meshes 4 are packed or needed to be removed as part of the maintenance of the grease trap, the residue trap 3 is provided with handles that helps user to remove the residue trap 3.

Next, the waste water moves toward a second chamber II. As mentioned the grease trap 1 is provided with a removable inner wall 8 with perforations 8a avoiding clogging. The purpose of the inner wall 8 is to keep the end of the mesh 4 away from the transfers 6, usually consisting of PVC piping or a perforation at the baffle, in such way that the grease trap 1 will continue working, chamber after chamber, until reaching its outlet. Further, some baffles are provided with overflow perforation 5 to guarantee the waste water movement through chambers II-VI in case of clogging at the transfer 6, 7. Chambers' walls including P.V.C. piping transfers 6, 7 and/or perforations are designed to provide an effective path that that contributes with the waste water treatment allowing the treating of the waste water.

The assembly of all these parts, including the residue trap 3, the frames, pipes and other materials can be performed in several ways. However, in the instance case the selected assembly includes picking the materials to be used as mentioned before. The first step will be to cut the body parts, such as lid, walls, baffles, bottom, mesh, drawer and others usually made with polypropylene material. Next, all parts are put together using plastic welding process, producing a well built monolithic unit, very strong and extremely durable. It is important to weld the body and baffles together with the exception of detachable baffles.

The PVC inlet 2a the outlet 2b, other fittings with its corresponding special gaskets and the intermediate transfer pipes are installed inside the body. Further, an aluminum frame comprising thick aluminum angles is installed around the circumference and on top of the grease trap transversal parts. Stainless Steel screws and locknuts are used for its assembling. The upper surface of the framing comprises a self adhesive sponge rubber joint that provides the appropriate seal for the grease trap 1 when closed. The good adhesion of this joint is very important. Also, since polypropylene surface does not have any adherence at all, excellent results are obtained with the adhesion of the foam joint directly to the aluminum frame.

Simultaneously with the above mentioned body assembly, the drawer 3 is prepared. As mentioned before, the drawer structure 3 should show a deeper bottom surface at the side of the openings 3a where the meshes 4 are connected. It may have two or more adapters to connect a mesh, one or two inlets, and an overflow fixture 3b. The mesh 4 is connected using the adapter as mentioned before. After the residue trap is assembled it is installed inside the first chamber II.

Next, for the lid's installation a polypropylene panel is covered with an aluminum sheet, for example Diamond Head mill finish aluminum sheet, in such way that the aluminum faces the top. Fixing means such as screws and locknuts are used in order to attach the lid's polypropylene panel and the aluminum sheet together. Finally, the apparatus is framed with aluminum angles.

Even when there are several ways to install and secure the lid to the grease trap body the present invention uses two different ways. The first one is directed to spaces with little clearance between the sink and the trap's lid. In this case it is preferable to use the dowel screws with butterfly nuts system. The second is directed to model with more space in which is preferable to use stainless steel hinges with bearings. However, the butterfly type is also an option.

While the invention has been described as having a preferred design, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A water-treating apparatus comprising:
   a housing comprising a plurality of panels, wherein said plurality of panels forms outer walls and chamber walls between said outer walls, wherein each said chamber wall includes at least one orifice,
   an inlet located at one of the outer walls, said inlet defining path for fluids to enter said housing,
   an outlet located at one of the outer walls, said outlet defining path to channel fluids out of said housing,
   a removable residue trap positioned inside one of the chambers,
   wherein said residue trap comprises a box-like compartment with an inclined bottom surface, at least a residue trap inlet, a support structure coupled to said inclined bottom surface at least one opening, wherein said at least one opening is coupled to a filter by means of an adapter, and at least one overflow escape opening.

2. A water-treating apparatus, as in claim 1 wherein said support structure is configured to control the displacement of said residue trap.

3. A water-treating apparatus as in claim 1, wherein the residue trap comprises a drawer structure.

4. A water-treating apparatus as in claim 1, wherein said at least one opening is located on a wall of said residue trap, wherein said wall is located on the opposite side of said residue trap inlet.

5. A water-treating apparatus as in claim 1, wherein said at least one opening and said overflow escape are located on a single wall of said residue trap, wherein said at least one opening is adjacent to said inclined bottom surface.

6. A water-treating apparatus as in claim 1, wherein said adapter comprises a filter holder having a hollow body comprising a flange at a distal end and a thread at the other end.

7. A water-treating apparatus as in claim 1, wherein said at least one opening has an elliptical shape.

8. A water-treating apparatus as in claim 1, wherein the chamber holding said residue trap has an inner wall comprising a plurality of orifices, wherein each orifice connects said chamber with a contiguous chamber.

9. A water-treating apparatus as in claim 8, wherein said inner wall is removable.

* * * * *